(12) United States Patent
Tseng et al.

(10) Patent No.: US 9,950,666 B1
(45) Date of Patent: Apr. 24, 2018

(54) CAR SEAT WITH WARNING FUNCTION

(71) Applicant: PRIMAX ELECTRONICS LTD., Taipei (TW)

(72) Inventors: Ying-Che Tseng, Taipei (TW); Cheng-Yi Tsai, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 15/364,464

(22) Filed: Nov. 30, 2016

(30) Foreign Application Priority Data

Oct. 21, 2016 (TW) .............................. 105134111 A

(51) Int. Cl.
| | |
|---|---|
| *B60Q 9/00* | (2006.01) |
| *B60N 2/00* | (2006.01) |
| *B60N 2/28* | (2006.01) |
| *B60R 25/10* | (2013.01) |
| *B60N 2/02* | (2006.01) |

(52) U.S. Cl.
CPC .............. *B60Q 9/00* (2013.01); *B60N 2/002* (2013.01); *B60N 2/0244* (2013.01); *B60N 2/28* (2013.01); *B60R 25/1001* (2013.01); *B60N 2002/0268* (2013.01)

(58) Field of Classification Search
CPC ........ B60Q 9/00; B60N 2/002; B60N 2/0244; B60N 2/28; B60R 25/1001

USPC ....................................................... 297/217.3
See application file for complete search history.

(56) References Cited

U.S. PATENT DOCUMENTS

| | | | |
|---|---|---|---|
| 2012/0086249 A1* | 4/2012 | Hotary ................. | B60N 2/0228 297/284.3 X |
| 2014/0210239 A1* | 7/2014 | Yetukuri .............. | B60N 2/0228 297/217.1 |
| 2014/0265479 A1* | 9/2014 | Bennett ................. | B60N 2/502 297/217.4 |

\* cited by examiner

*Primary Examiner* — Anthony D Barfield
(74) *Attorney, Agent, or Firm* — Kirton McConkie; Evan R. Witt

(57) ABSTRACT

A car seat with a warning function includes a seat body having a seat cushion, plural adjusting posts, a wireless transmission module, a control unit and a warning element. The wireless transmission module is in wireless communication with an electronic device. When the adjusting posts are pushed by the seat cushion, the lengths of the adjusting posts are changed. If the control unit receives a body curve data from the electronic device and judges that the body curve data complies with a predetermined body data, the control unit changes the lengths of the adjusting posts according to the body curve information. Consequently, the shape of the seat cushion fits the body shape of the user. If the control unit judges that the body curve data does not comply with the predetermined body data, the control unit controls the warning element to output a warning signal.

7 Claims, 4 Drawing Sheets

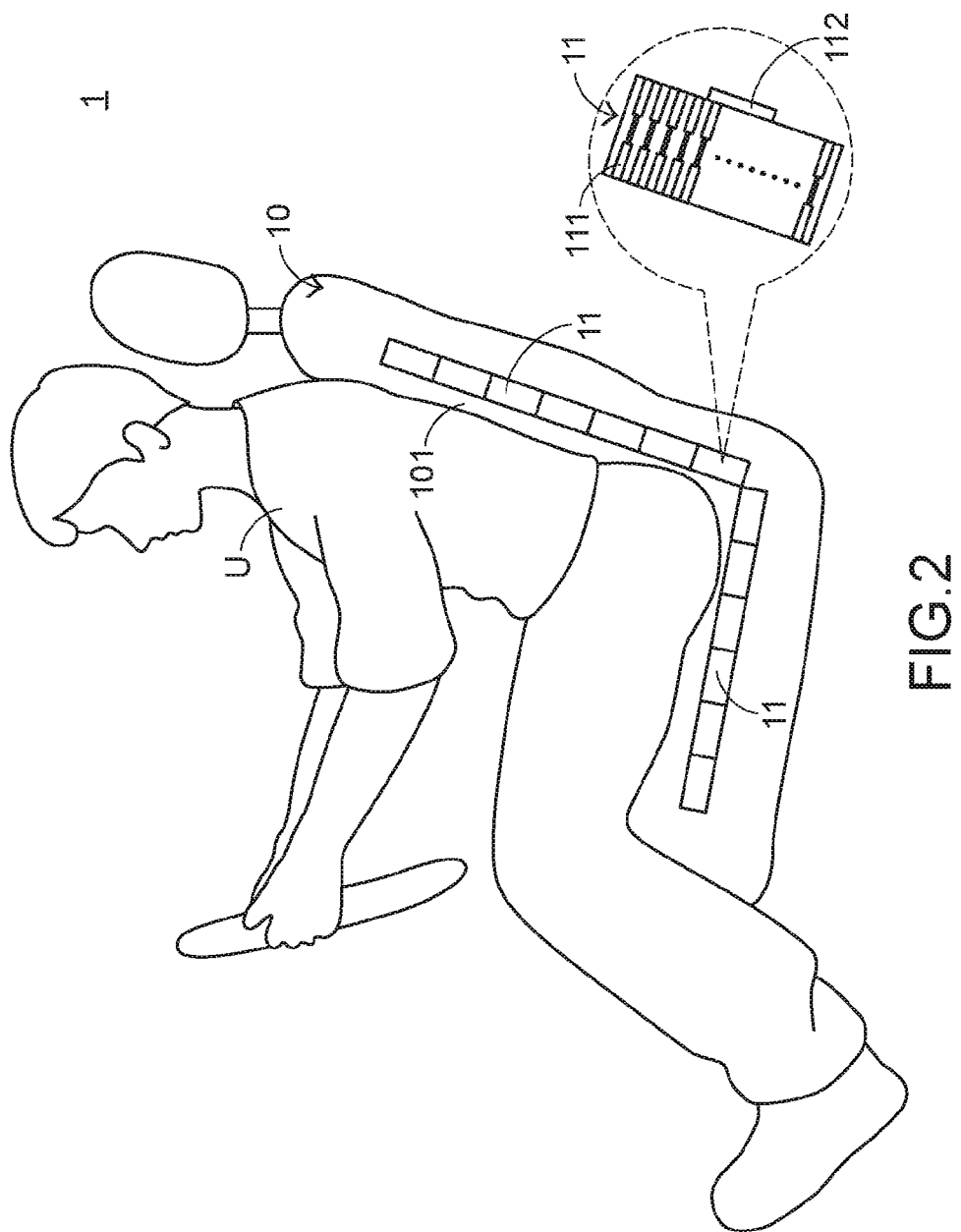

CAR SEAT WITH WARNING FUNCTION

FIELD OF THE INVENTION

The present invention relates to a seat, and more particularly to a car seat for use in a vehicle.

BACKGROUND OF THE INVENTION

Generally, a vehicle can be driven by different users. Since the car seat in the vehicle is usually designed according to a public size, the car seat cannot conform to the body shapes of all users. Moreover, the car seat is usually adjustable. For example, the base of the car seat can be moved back and forth, and the seat back of the car seat can be swung in order to fit the body shapes of different uses and provide comfortable driving conditions. It is important to adjust the car seat. Since the user's sight line and viewing angle are influenced, the adjustment of the car seat is closely related to the traffic safety.

With the development of science and technology, the seat adjustment function of the adjustable car seat has been evolved from the manual mechanism to the electric mechanism. Consequently, the user can effortlessly adjust the car seat.

In spite of the convenience of the adjustable car seat, there are still some drawbacks. For example, the user still needs to self-adjust the car seat. Moreover, in case that the user goes out in an urgent situation, the user may forget to adjust the car seat hurriedly. Under this circumstance, the traffic safety is adversely affected.

Therefore, there is a need of providing a car seat that can be automatically adjusted.

SUMMARY OF THE INVENTION

An object of the present invention provides a car seat that can be automatically adjusted.

Another object of the present invention provides a car seat with a warning function in order to achieve a burglarproof purpose.

In accordance with an aspect of the present invention, there is provided a car seat with a warning function. The car seat is installed in a vehicle. The car seat includes a seat body, plural adjusting posts, a wireless transmission module, a control unit and a warning element. The seat body includes a seat cushion. The seat cushion is contactable with a human body of a user. The plural adjusting posts are disposed within the seat body and contacted with the seat cushion. A length of at least one adjusting post of the plural adjusting posts is changeable. The wireless transmission module is in wireless communication with an electronic device so as to receive a body curve data from the electronic device. The control unit is electrically connected with the plural adjusting posts and the wireless transmission module. The control unit judges whether the body curve data complies with a predetermined body data. The warning element is electrically connected with the control unit. If the control unit judges that the body curve data does not comply with the predetermined body data, the warning element issues a warning signal. If the control unit judges that the body curve data complies with the predetermined body data, the control unit adjusts the length of the at least one adjusting post according to the body curve data, so that a shape of the seat cushion fits a body shape of the human body of the user.

From the above descriptions, the present invention provides a car seat with a warning function. The car seat can detect the body shapes of different users and recode the body shapes as different body curve data. After the body curve data corresponding to each user is established, the lengths of the plural adjusting posts of the car seat are changed according to the body curve data. Consequently, the shape of the seat cushion fits the body shape of the user. Moreover, after the car door is opened and the user enters the vehicle, the car seat requests the user to provide the body curve data or the user password in order to adjust the shape of the seat cushion. Moreover, since the body curve data or the user password can be used as the basis of recognizing the identity, the burglarproof purpose of the vehicle is achievable.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 2 schematically illustrates the structure of the car seat with a warning function according to an embodiment of the present invention.

DETAILED DESCRIPTION OF THE PREFERRED EMBODIMENT

For solving the drawbacks of the conventional technologies, the present invention provides a car seat with a warning function.

Figure 1:
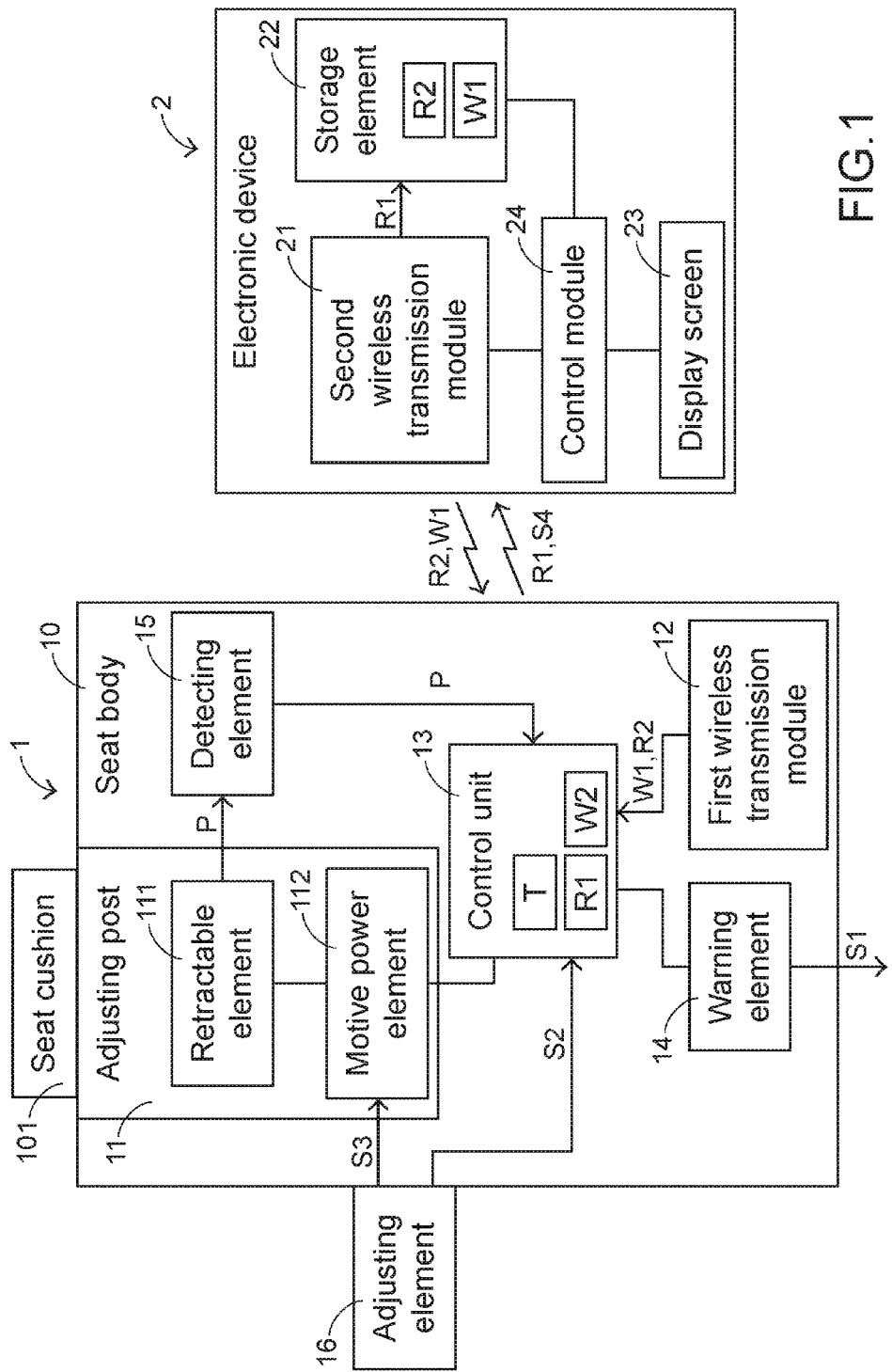
FIG. 1 is a schematic functional block diagram illustrating a car seat with a warning function and an electronic device according to an embodiment of the present invention.

Please refer to FIGS. 1 and 2. FIG. 1 is a schematic functional block diagram illustrating a car seat with a warning function and an electronic device according to an embodiment of the present invention. FIG. 2 schematically illustrates the structure of the car seat with a warning function according to an embodiment of the present invention.

The car seat 1 is installed in a vehicle (not shown). In addition, the car seat 1 is in wireless communication with an electronic device 2. The car seat 1 comprises a seat body 10, plural adjusting posts 11, a first wireless transmission module 12, a control unit 13, a warning element 14, plural detecting elements 15 and an adjusting key 16. For succinctness, only one adjusting post 11 and only one detecting element 15 are shown in FIG. 1. The seat body 10 comprises a seat cushion 101. The seat cushion 101 is contactable with a human body U of a user. The plural adjusting posts 11 are disposed within the seat body 10 and contacted with the seat cushion 101. The length of the adjusting post 11 is changeable. The plural adjusting posts 11 comprise plural retractable parts 111 and plural motive power elements 112. The retractable parts 111 are disposed within the seat body 10 and contacted with the seat cushion 101. When the retractable parts 111 are pushed by the seat cushion 101, the lengths of the retractable parts 111 are shortened. The motive power elements 112 are coupled with the plural retractable parts 111 and electrically connected with the control unit 13. According to an adjusting signal from the control unit 13, the motive power elements 112 output motive power to the corresponding retractable parts 111 in order to adjust the lengths of the retractable parts 111. In this embodiment, one motive power element 112 corresponds to more than two retractable parts 111, and the motive power element 112 is coupled with the corresponding retractable parts 111. An example of the motive power element 112 is a motor.

The adjusting key 16 is electrically connected with the plural motive power elements 112. By operating the adjusting key 16, the motive power elements 112 are selectively enabled or disabled or a confirmation signal S2 is issued to the control unit 13. The plural detecting elements 15 are electrically connected with the plural adjusting posts 11 and the control unit 13. Moreover, the detecting elements 15 detect the lengths of the plural adjusting posts 11, i.e., the pushed conditions of the plural adjusting posts 11. According to the detecting results of the plural adjusting posts 11, plural pressure values P are correspondingly acquired. Moreover, the plural pressure values P are transmitted to the control unit 13. The first wireless transmission module 12 is in wireless communication with the electronic device 2. Moreover, the first wireless transmission module 12 receives a body curve data R2 from the electronic device 2. In an embodiment, one detecting element 15 corresponds to more than two retractable parts 111, and the detecting element 15 is connected with the corresponding retractable parts 111. An example of the detecting element 15 is a pressure sensor.

The control unit 13 is electrically connected with the plural adjusting posts 11 and the first wireless transmission module 12. The control unit 13 provides three functions. Firstly, the control unit 13 receives the plural pressure values P corresponding to the plural adjusting posts 11 according to the pushing extent of the human body U of the user on the seat cushion 101, and the control unit 13 creates a predetermined body data R1 according to the plural pressure values P. Secondly, the control unit 13 assigns the first wireless transmission module 12 to transmit the predetermined body data R1 to the electronic device 2. Thirdly, the control unit 13 judges whether the body curve data R2 complies with the predetermined body data R1. The warning element 14 is electrically connected with the control unit 13. If the control unit 13 judges that the body curve data R2 does not comply with the predetermined body data R1, the warning element 14 generates a warning signal S1. In an embodiment, the control unit 13 is a microprocessor, and the warning element 14 is an alarm. Moreover, the warning signal S1 contains a sound signal or a flickering light signal.

On the other hand, the electronic device 2 comprises a second wireless transmission module 21, a storage element 22, a display screen 23 and a control module 24. The second wireless transmission module 21 is disposed within the electronic device 2. Moreover, the second wireless transmission module 21 is in wireless communication with the first wireless transmission module 12. Consequently, the connection between the car seat 1 and the electronic device 2 is established. The storage element 22 is disposed within the electronic device 2 and electrically connected with the second wireless transmission module 21. After the predetermined body data R1 is received by the second wireless transmission module 21, the predetermined body data R1 can be stored in the storage element 22. Meanwhile, the predetermined body data R1 stored in the storage element 22 in defined as the body curve data R2. The display screen 23 is partially exposed outside the electronic device 2. Moreover, a user operation interface of the electronic device is shown on the display screen 23 to be viewed by the user. The control module 24 is electrically connected with the second wireless transmission module 21, the storage element 22 and the display screen 23. According to the received signals, the control module 24 performs the corresponding operations. These operations will be described later. An example of the electronic device 2 includes but is not limited to a smart phone, a tablet computer, a personal digital assistant (PDA) or any other appropriate handheld electronic device. Moreover, the first wireless transmission module 12 and the second wireless transmission module 21 are in wireless communication with each other by a Wi-Fi transmission technology, a 3G/4G transmission technology, a Bluetooth transmission technology or an infrared transmission technology. Moreover, the control module 24 is a handheld device application program.

Figure 3A:
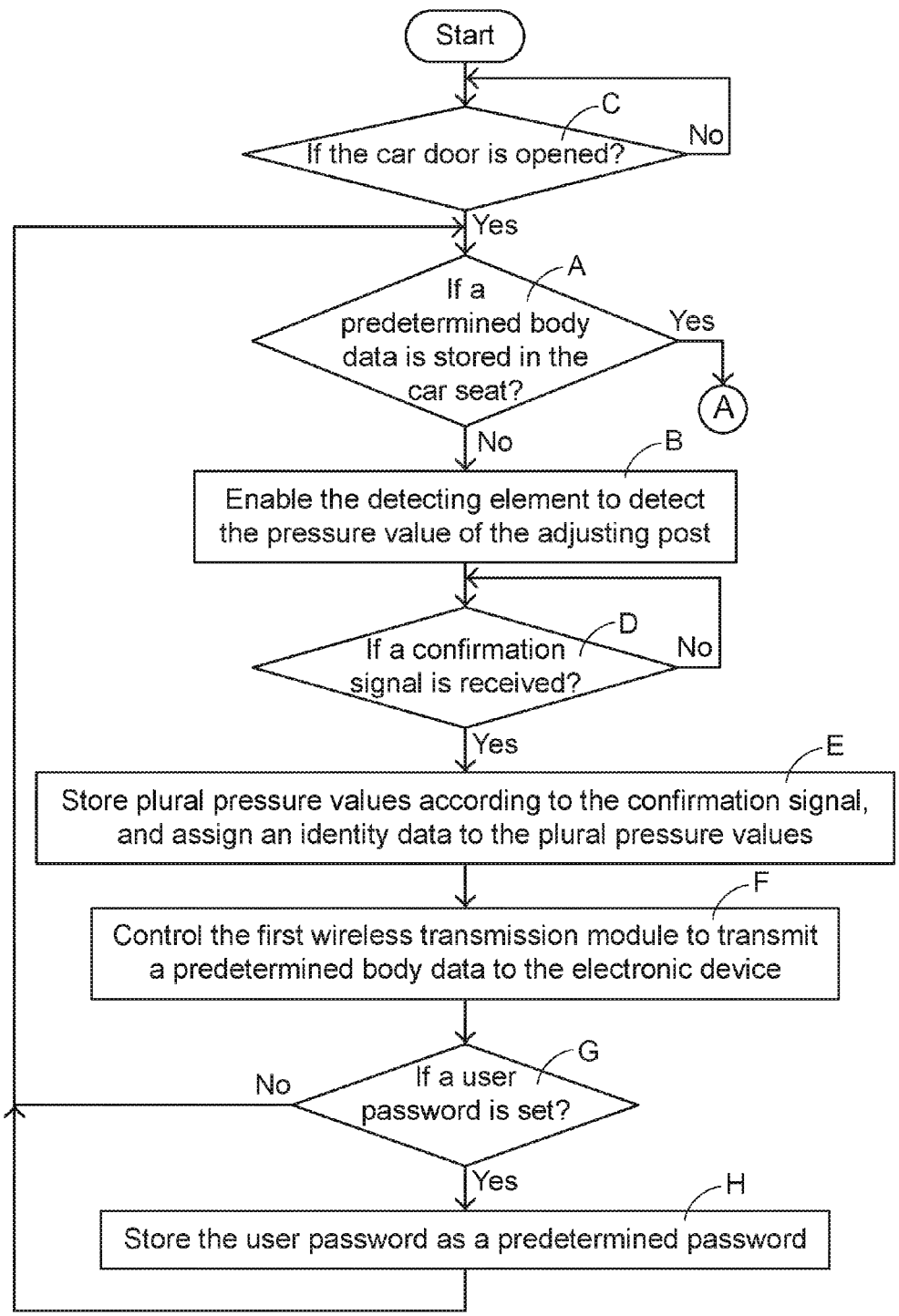
FIGS. 3A and 3B schematically illustrate an operating method of the control unit of the car seat with the warning function according to an embodiment of the present invention.
Figure 3B:
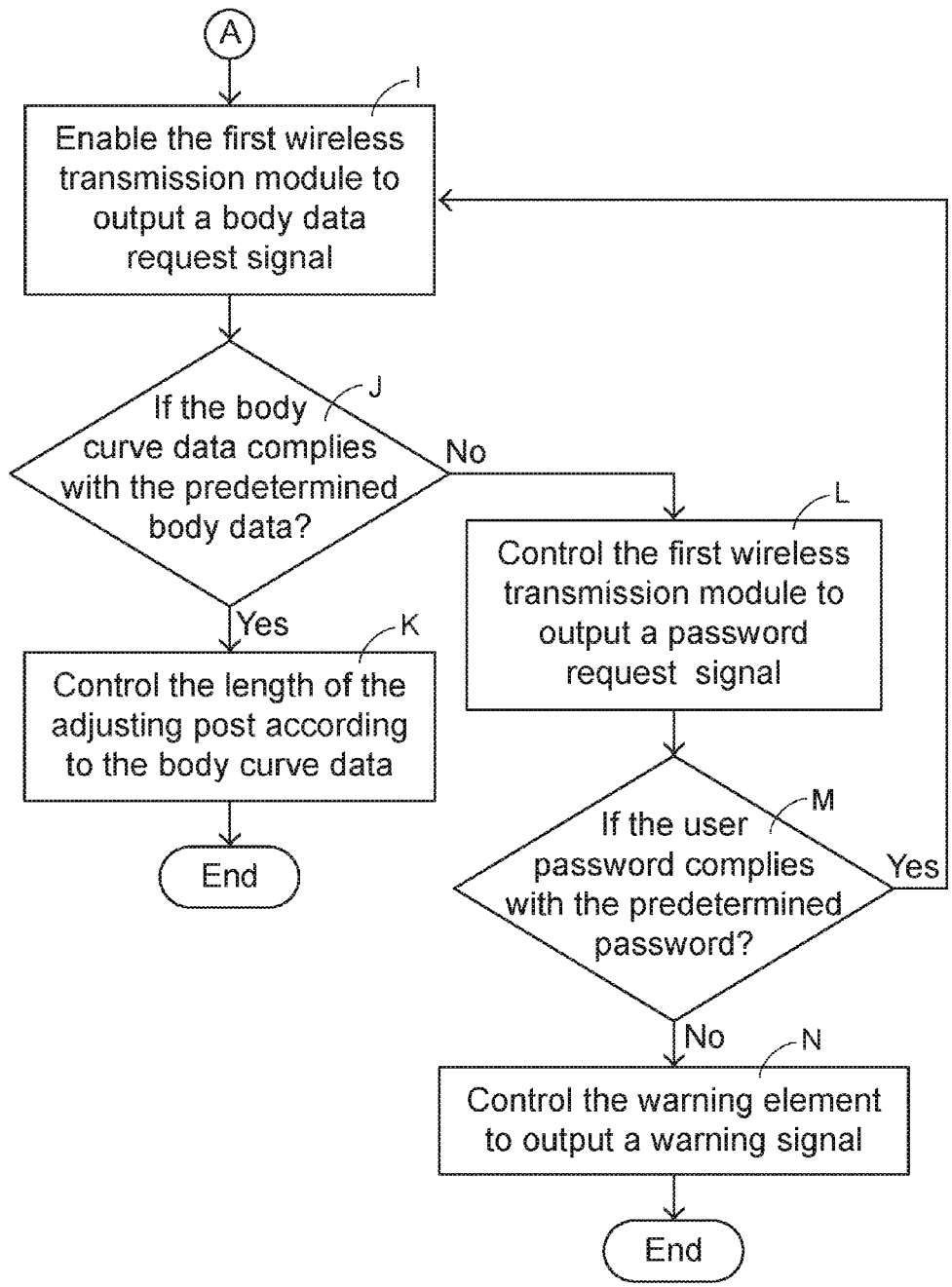

FIGS. 3A and 3B schematically illustrate an operating method of the control unit of the car seat with the warning function according to an embodiment of the present invention. The operating method of the control unit 13 will be described as follows.

In a step C: the control unit detects whether the car door is opened.

In a step A, the control unit judges whether a predetermined body data is stored in the car seat.

In a step B, the detecting element is enabled to detect the pressure value of the adjusting post.

In a step D, the control unit judges whether a confirmation signal is received.

In a step E, plural pressure values are stored according to the confirmation signal, and an identity data is assigned to the plural pressure values.

In a step F, the control unit controls the first wireless transmission module to transmit the predetermined body data to the electronic device.

In a step G the control unit judges whether a user password is set.

In a step H, the user password is stored as a predetermined password.

In a step I, the first wireless transmission module is enabled to output a body data request signal.

In a step J, the control unit judges whether the body curve data complies with the predetermined body data.

In a step K, the control unit controls the length of the adjusting post according to the body curve data.

In a step L, the control unit controls the first wireless transmission module to output a password request signal.

In a step M, the control unit judges whether the user password complies with the predetermined password.

In a step N, the control unit controls the warning element to output a warning signal.

If the control unit detects that the car door is opened in the step C, the step A is performed. Whereas, if the judging condition of the step C is not satisfied, the step C is repeatedly done. If the control unit judges that predetermined body data has been stored in the car seat 1 in the step A, the step I is performed. Whereas, if the judging condition of the step A is not satisfied, the B is performed. If the control unit judges that confirmation signal has been received in the step D, the step E is performed. Whereas, if the judging condition of the step D is not satisfied, the D is repeatedly done. If the control unit judges that the user password has been received in the step G the step H is performed. Whereas, if the judging condition of the step G is not satisfied, the step A is repeatedly done. If the control unit judges that the body curve data complies with the predetermined body data in the step J, the step K is performed. Whereas, if the judging condition of the step J is not satisfied or the body curve data is not received, the step L is performed. If the control unit judges that the user password complies with the predetermined password in the step M, the step I is repeatedly done. Whereas, if the judging condition of the step M is not satisfied or the user password is not received, the step N is performed.

Hereinafter, the operations of the car seat 1 with the warning function will be illustrated with reference to FIGS. 1, 2, 3A and 3B. Firstly, the car seat 1 is activated, and the control unit 13 performs the step C. That is, the control unit 13 periodically detects whether the car door (not shown) is opened at a specified time interval. When the user wants to drive the vehicle and opens the car door, the step C is completed. Then, the control unit 13 performs the step A of judging whether any predetermined body data R1 is stored in the car seat 1. In case that the car seat 1 is in an initial usage state, the control unit 13 judges that no predetermined body data R1 is stored in the car seat 1. Under this circumstance, the step B is performed subsequently. That is, the detecting element 15 is enabled to detect the pressure values of the adjusting posts 11. Preferably but not exclusively, the control unit 13 issues a message to prompt the user to sit on the seat body 10 through the warning element 14 or a display device (not shown) of the car seat 1. According to the message, the user is guided to take associated actions.

When the user sits on the seat body 10 and the human body U of the user is in contact with the seat cushion 101, the human body U of the user pushes the seat cushion 101 and applies pressures to the plural adjusting post 11. Consequently, the lengths of the retractable parts 111 are changed according to the body shape of the human body U of the user. Moreover, since the lengths of the retractable parts 111 are changed, the plural detecting elements 15 receive plural pressure values P corresponding to the length changes of the retractable parts 111. If the user judges that the shape of the seat cushion 101 fits the body shape of the user, the user may presses the adjusting key 16. Consequently, the confirmation signal S2 is outputted to the control unit 13. If the user judges that the shape of the seat cushion 101 does not fit the body shape of the user, the user may operate the adjusting key 16 to output an adjusting signal S3 to the motive power elements 112. Consequently, the user can self-adjust the lengths of the retractable parts 111 until the shape of the seat cushion 101 fits the body shape of the user.

After the step B is completed, the control unit 13 performs the step D of judging whether the confirmation signal S2 is received. If the confirmation signal S2 is received, the control unit 13 performs the step E. That is, the plural pressure values P are stored according to the confirmation signal S2, and the identity data T is assigned to the plural pressure values P. Consequently, the predetermined body data R1 is defined by the identity data T and the plural pressure values P collaboratively. The identity data T is correlated with the human body U of the user that is being sitting on the seat body 10. In case that another user sits on the seat body 10, the body shape of this user is certainly different from the body shape of the human body U of the original user. Under this circumstance, the plural pressure values received by the control unit 13 are different from the original plural pressure values P. Consequently, the control unit assigns another identity data to the received pressure values, and a different predetermined body data is defined.

After the predetermined body data R1 is generated, the predetermined body data R1 is stored by the control unit 13. Then, the step F is performed. That is, the predetermined body data R1 is transmitted to the second wireless transmission module 21 of the electronic device 2 through the first wireless transmission module 12. After the predetermined body data R1 is received by the second wireless transmission module 21, the control module 24 stores the predetermined body data R1 as the body curve data R2. Moreover, the body curve data R2 is stored in the storage element 22.

After the body curve data R2 is stored in the electronic device 2 of the user, the user may decide whether a user password W1 is set in the step G. If the user does not decide to set the user password W1, the control module 24 notifies the control unit 13. According to the decision of the user, the control unit 13 performs the step A again. If the user decides to set the user password W1 and then the user password W1 is set, the control module 24 issues the user password W1 to the car seat 1 by a wireless transmission technology. In addition, the user password W1 is stored in the storage element 22. After the user password W1 is received by the control unit 13, the user password W1 is stored as a predetermined password W2 (Step H). Meanwhile, the task of setting the car seat 1 for the first time is completed.

After the setting task is completed, the control unit 13 performs the step A again. Since the predetermined body data R1 has been stored in the car seat 1, the control unit 13 performs the step I subsequently. In the step I, the first wireless transmission module 12 is enabled, and a body data request signal S4 is transmitted to the second wireless transmission module 21 through the first wireless transmission module 12. Moreover, after the body data request signal S4 is received by the electronic device 2, the control module 24 issues the body curve data R2 to the car seat 1.

Then, the body curve data R2 is transmitted to the control unit 13 through the second wireless transmission module 21 and the first wireless transmission module 12. In the step J, the control unit 13 judges whether the body curve data R2 complies with the predetermined body data R1. If the control unit judges that the body curve data R2 complies with the predetermined body data R1, the control unit 13 performs the step K. That is, the control unit 13 controls the plural motive power elements 112 to adjust the lengths of the plural retractable parts 111 according to the body curve data R2. Consequently, the shape of the seat cushion 101 matches the body curve data R2. That is, the shape of the seat cushion 101 is automatically adjusted according to the body shape of the human body U of the user. Whereas, if the predetermined body data R1 is not received by the control unit 13 or the body curve data R2 does not comply with the predetermined body data R1, the control unit 13 performs the step L. That is, the control unit 13 controls the first wireless transmission module 12 to output a password request signal S2. When the password request signal S2 is received by the electronic device 2, the user can input the user password W1 through the control module 24. Consequently, the user password W1 is transmitted to the car seat 1.

After the step L is completed, the control unit 13 performs the step M of judging whether the user password W1 complies with the predetermined password W2. If the control unit 13 receives the user password W1 and judges that the user password W1 complies with the predetermined password W2, it means that the body curve data R2 is possibly suffered from erroneous transmission or erroneous authentication. Then, the step I is repeatedly done. Consequently, the body curve data R2 is acquired by the car seat 1. If the user password W1 is not received or the user password W1 does not comply with the predetermined password W2, the step N is performed. Meanwhile, the control unit 13 controls the warning element 14 to output a warning signal S1. Preferably, while the warning element 14 outputs the warning signal S1 in the step N, the control unit 13 issues a prompt message to the electronic device 2.

Consequently, the car seat 1 of the present invention can provide a warning function. In other words, the car seat 1 not only outputs the warning signal S1 through the warning element 14 but also issues the prompt message to notify the user.

The following three aspects should be specially described. Firstly, in some other embodiments, the user does not need to set the user password. Under this circumstance, the step G of judging whether the user password is set may be omitted. In the step J, if the control unit judges that the body curve data R2 does not comply with the predetermined body data R1 or the predetermined body data R1 is not received, the control unit 13 performs the step N. That is, even if the step of authenticating the user password is omitted, the car seat 1 can still provide the warning function.

Secondly, if the control unit judges that the user password W1 is not received or the user password W1 does not comply with the predetermined password W2 in the step M, the step L and the step M can be performed many times. That is, if the judging result indicates that the user password W1 does not comply with the predetermined password W2 many times, the step N is performed subsequently. Consequently, even if the electronic device 2 has a malfunction in a short time and the user password W1 is unable to be normally transmitted, the possibility of causing erroneous judgment will be minimized. In other words, the above approach is adopted when the step G of setting the user password is not omitted.

Thirdly, in another embodiment, the number of the predetermined body data can be set by the user. For example, if the control unit judges that no predetermined body data is stored in the car seat in the step A, the user may select the number of the predetermined body data. In case that the number of the predetermined body data is larger than 1, the car seat of the present invention can be used by many users. In views of safety, the control unit requests the user to input the user password that is identical to the predetermined password after one predetermined body data is set. Consequently, the predetermined body data cannot be arbitrarily set by other persons.

From the above descriptions, the present invention provides a car seat with a warning function. The car seat can detect the body shapes of different users and recode the body shapes as different body curve data. After the body curve data corresponding to each user is established, the lengths of the plural adjusting posts of the car seat are changed according to the body curve data. Consequently, the shape of the seat cushion fits the body shape of the user. Moreover, after the car door is opened and the user enters the vehicle, the car seat requests the user to provide the body curve data or the user password in order to adjust the shape of the seat cushion. Moreover, since the body curve data or the user password can be used as the basis of recognizing the identity, the burglarproof purpose of the vehicle is achievable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A car seat with a warning function, the car seat being installed in a vehicle and comprising:

a seat body comprising a seat cushion, wherein the seat cushion is contactable with a human body of a user;

plural adjusting posts disposed within the seat body and contacted with the seat cushion, wherein a length of at least one adjusting post of the plural adjusting posts is changeable;

a wireless transmission module in wireless communication with an electronic device so as to receive a body curve data from the electronic device;

a control unit electrically connected with the plural adjusting posts and the wireless transmission module, wherein the control unit judges whether the body curve data complies with a predetermined body data; and a warning element electrically connected with the control unit, wherein if the control unit judges that the body curve data does not comply with the predetermined body data, the warning element issues a warning signal, wherein if the control unit judges that the body curve data complies with the predetermined body data, the control unit adjusts the length of the at least one adjusting post according to the body curve data, so that a shape of the seat cushion fits a body shape of the human body of the user, wherein when a car door of the vehicle is opened, the control unit judges whether the predetermined body data is stored in the car seat, wherein if the control unit judges that the predetermined body data has been stored in the car seat, the wireless transmission module is enabled to receive the body curve data, wherein if the control unit judges that the predetermined body data is not stored in the car seat, the control unit creates the predetermined body data, wherein after the body curve data is received by the wireless transmission module, the control unit judges whether the body curve data complies with the predetermined body data, wherein if the body curve data is not received by the wireless transmission module, the control unit issues a password request signal to the electronic device through the wireless transmission module, wherein after the electronic device outputs a user password in response to the password request signal, the control unit judges whether the user password complies with a predetermined password, wherein if the control unit judges that the user password complies with the predetermined password, the control unit enables plural detecting elements to detect the lengths of the plural adjusting posts, wherein if the control unit judges that the user password does not comply with the redetermined password, the control unit enables the warning element to output the warning signal.

2. The car seat according to claim 1, wherein the car seat further comprises plural detecting elements, and the plural detecting elements are electrically connected with the plural adjusting posts and the control unit, wherein after the plural detecting elements detect length conditions of the plural adjusting posts, the plural detecting elements acquire plural pressure values and output the plural pressure values to the control unit.

3. The car seat according to claim 2, wherein if the predetermined body data has not be created and the human body of the user is in contact with the seat cushion, the plural adjusting posts are pushed by the human body of the user and the length of the at least one adjusting post is changed, wherein after the plural detecting elements detect the length conditions of the plural adjusting posts, the plural detecting elements acquire the plural pressure values and output the plural pressure values to the control unit, wherein after the plural pressure values are received by the control unit, the control unit assigns an identity data to the plural pressure values in response to a confirmation signal, so that the predetermined body data is defined.

4. The car seat according to claim 3, wherein the control unit issues the identity data and the plural pressure values to the electronic device through the wireless transmission module, so that the body curve data is defined.

5. The car seat according to claim 1, wherein the at least one adjusting post comprises:
- a retractable part disposed within the seat body and contacted with the seat cushion, wherein when the retractable part is pushed by the seat cushion, a length of the retractable part is shortened; and
- a motive power element coupled with the retractable part and electrically connected with the control unit, wherein according to an adjusting signal from the control unit, the motive power element outputs motive power to the retractable part so as to adjust the length of the retractable part.

6. The car seat according to claim 5, wherein the car set further comprises an adjusting key, and the adjusting key is electrically connected with the motive power element, wherein by operating the adjusting key, the motive power element is selectively controlled to output the motive power.

7. The car seat according to claim 1, wherein while the warning element outputs the warning signal, the control unit issues a prompt message to the electronic device in response to the warning signal.

* * * * *